(12) United States Patent
Han et al.

(10) Patent No.: US 12,400,059 B1
(45) Date of Patent: Aug. 26, 2025

(54) LOGIC SHARING MAXIMIZATION USING NON-UNIQUE MATRIX REPRESENTATION

(71) Applicant: Cadence Design Systems, Inc., San Jose, CA (US)

(72) Inventors: Kwangsoo Han, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 569 days.

(21) Appl. No.: 17/978,189

(22) Filed: Oct. 31, 2022

(51) Int. Cl.
| | | |
|---|---|---|
| *G06F 30/3312* | (2020.01) | |
| *G06F 30/323* | (2020.01) | |
| *G06F 30/327* | (2020.01) | |
| *G06F 30/3308* | (2020.01) | |
| *G06F 30/337* | (2020.01) | |
| *G06F 30/367* | (2020.01) | |
| *G06F 30/373* | (2020.01) | |
| *G06F 30/398* | (2020.01) | |
| *G06F 119/12* | (2020.01) | |

(52) U.S. Cl.
CPC ........ *G06F 30/3312* (2020.01); *G06F 30/327* (2020.01); *G06F 30/323* (2020.01); *G06F 30/3308* (2020.01); *G06F 30/337* (2020.01); *G06F 30/367* (2020.01); *G06F 30/373* (2020.01); *G06F 30/398* (2020.01); *G06F 2119/12* (2020.01)

(58) Field of Classification Search
CPC .. G06F 30/3312; G06F 30/327; G06F 30/323; G06F 30/3308; G06F 30/337; G06F 30/367; G06F 30/373; G06F 30/398; G06F 2119/12

USPC ....... 716/108, 103, 105, 107, 111, 132, 136; 703/15

See application file for complete search history.

(56) References Cited

U.S. PATENT DOCUMENTS

| | | | | |
|---|---|---|---|---|
| 7,380,221 | B2 * | 5/2008 | Baumgartner | G06F 30/327 716/134 |
| 7,913,218 | B2 * | 3/2011 | Baumgartner | G06F 30/327 716/132 |
| 8,671,375 | B1 * | 3/2014 | Chung | G06F 30/3312 716/113 |
| 2003/0023942 | A1 * | 1/2003 | Kurupati | G06F 30/3323 716/107 |

(Continued)

*Primary Examiner* — Phallaka Kik
(74) *Attorney, Agent, or Firm* — Schwegman Lundberg & Woessner, P.A.

(57) ABSTRACT

Aspects of the present disclosure address systems and methods for applying logic sharing transformations to integrated circuit designs. Consistent with some embodiments, a cube-literal matrix is generated for an integrated circuit design. The cube-literal matrix comprises a non-unique matrix representation of functional logic in the integrated circuit design. A candidate cube is extracted from the cube-literal matrix to evaluate for application of a logic sharing transformation. The candidate cube comprises a sub-matrix of the cube-literal matrix corresponding to two or more common inputs of two or more logical operators. Based on determining that application of the logic sharing transformation to the candidate cube results in a reduction to a literal count in the integrated circuit design, the cube-literal matrix is updated to reflect the application of the logic sharing transformation to the candidate cube and the integrated circuit design is updated based on the updated cube-literal matrix.

20 Claims, 6 Drawing Sheets

(56) References Cited

U.S. PATENT DOCUMENTS

2006/0075011 A1* 4/2006 Fallah ................... G06F 17/10
                                                   708/490
2019/0026078 A1* 1/2019 Bannon ................. G06F 17/16
2019/0372753 A1* 12/2019 Dorrendorf ............. G09C 1/00

* cited by examiner

LOGIC SHARING MAXIMIZATION USING NON-UNIQUE MATRIX REPRESENTATION

TECHNICAL FIELD

The present disclosure generally relates to the technical field of integrated circuit (IC) design. In particular, the present disclosure addresses techniques for logic sharing in an electronic design automation (EDA) process flow that includes use of a non-unique matrix representation.

BACKGROUND

Design engineers design ICs by transforming circuit descriptions of the ICs into geometric descriptions, called layouts. To create layouts, design engineers typically use EDA applications. These applications provide sets of computer-based tools for creating, editing, and analyzing IC design layouts.

EDA applications create layouts by using geometric shapes that represent different materials and devices on ICs. For instance, EDA tools commonly use rectilinear lines to represent the wire segments that interconnect the IC components. These tools also represent electronic and circuit IC components as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
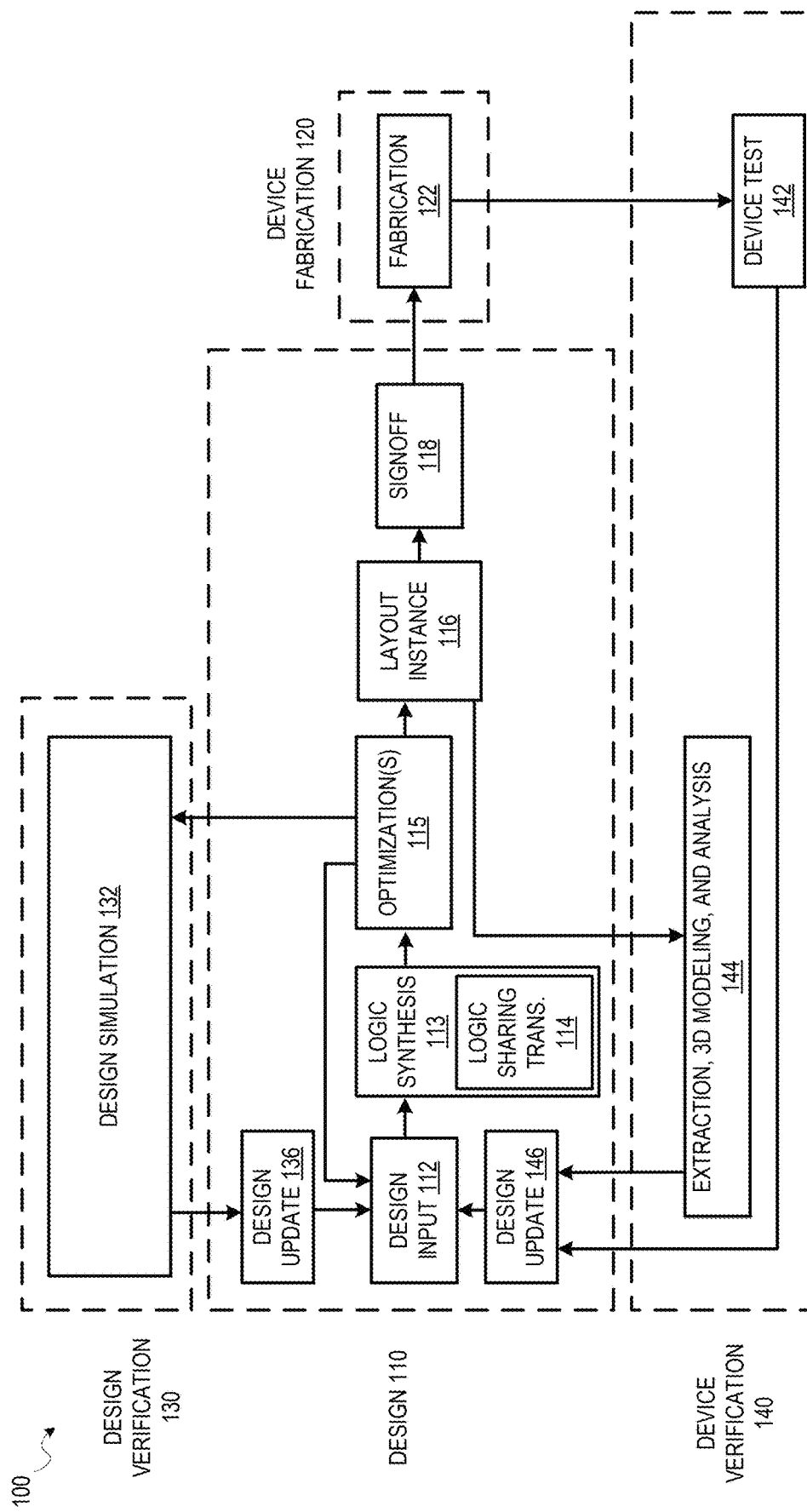
FIG. 1 is a diagram illustrating an example IC design flow that includes application of a logic sharing transformation, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The EDA process for IC design entails various operations. A key operation in the EDA design flow is logic synthesis. During logic synthesis, an abstract specification of desired circuit behavior, typically in the form of a register transfer level (RTL) input file describing a plurality of Boolean logic equations, is translated into a representation of logic gates. Logic structuring is an important optimization performed during logic synthesis. Logic structuring typically involves application of logic sharing transformations to IC designs improve area and power.

Conventional logic sharing transformation techniques use a cube-literal matrix, which represents functional logic in a unique matrix form. Within the context of a cube-literal matrix, rows, each of which correspond to a logic gate in the IC design, are referred to as "cubes" and columns, each of which correspond to an input signal received by one of the logic gates, are referred to as "literals." For conventional logic sharing transformation methodologies, functional logic is converted to a two-level sum of products (SOP) form of a Boolean equation and the Boolean equation is converted into matrix form. With these conventional techniques, when converting the functional logic to the 2-level SOP form, NAND operators are converted to OR operators and NOR operators are converted to AND operators. Converting the entire IC design into an AND/OR graph in this manner creates a unique mapping between the functional logic of the IC and its representation in the cube-literal matrix. However, creating the cube-literal matrix in this manner can lead to an unnecessarily large number of cubes in the cube-literal matrix where opportunities for logic sharing may be missed because of the manner in which NAND operators are treated differently than AND operators and NOR operators are treated differently than OR operators.

Aspects of the present disclosure address problems with conventional approaches to applying logic sharing transformations to IC designs with an EDA system that uses a non-unique cube-literal matrix to identify opportunities to apply the logic sharing transformation. That is, rather than converting NAND operators to OR operators and NOR operators to AND operators in the Boolean expression prior to conversion to the cube-literal matrix, the EDA system generates the cube-literal matrix without differentiating AND and NAND operators and without differentiating OR and NOR operators. By generating the cube-literal matrix in this manner, different functional logic can result in the same cube-literal matrix being generated. That is, a cube-literal matrix for first functional logic may be identical to a cube-literal matrix for a second functional logic even if the first and second functional logic is different.

Consistent with some embodiments, a method performed by the EDA system (e.g., as part of a logic synthesis operation) includes accessing data describing an IC design that includes a set of logic gates and generating a cube-literal matrix based on the IC design. As noted above, the cube-literal matrix comprises a non-unique matrix representation of functional logic corresponding to the set of logic gates. The EDA system extracts a candidate cube from the cube-literal matrix to evaluate for application of a logic sharing transformation. The candidate cube comprises a sub-matrix of the cube-literal matrix corresponding to two or more logic gates with two or more common input signals (literals). The EDA system evaluates whether to apply the logic sharing transformation to the candidate cube based on whether doing so results in a total literal count reduction for the design. If application of the logic sharing transformation results in a total literal count reduction, the EDA system updates the cube-literal matrix. The EDA system updates the cube-literal matrix by adding an additional row corresponding to the candidate cube and adding an additional column (literal). The additional column corresponds to an output of a logic gate corresponding to the additional row to receive the two or more common input signals and the output is provided as an input to the two or more logic gates that previously shared the two or more common input signals. The EDA system updates the data describing the IC design based on the updated cube-literal matrix.

The above referenced process can be repeated until the EDA system is unable to extract candidate cubes from the cube-literal matrix. By not differentiating between AND and NAND operators and OR and NOR operators in generating cube-literal matrix, the EDA system is able to identify a greater number of opportunities for logic sharing and, as a result, use of the non-unique cube-literal matrix in deciding when to apply the logic sharing transformation results greater reductions to area and power consumption by the IC.

FIG. 1 is a diagram illustrating an example IC design flow 100 that includes application of a logic sharing transformation, according to some embodiments. It will be understood that any one or more aspects of the IC design flow 100 may be performed by a computing device executing instructions of an EDA software system. For instance, one or more portions of the IC design flow 100 may be represented by executable instructions (e.g., EDA software) that, when executed by a processor of a computing device, cause the computing device to the corresponding portion of the IC design flow 100. Thus, an operation of the design flow 100 may be performed by a hardware processor (e.g., central processing unit or graphics processing unit) of a computing device (e.g., desktop, server, etc.).

As shown, the EDA design process flow 100 includes a design phase 110, a device fabrication phase 120, a design verification phase 130, and a device verification phase 140.

The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

For some embodiments, the design phase 110 includes a high-level synthesis operation that includes receiving a high-level description of an IC design (e.g., in C/C++; as part of the initial design input 112), and converting the high-level description to a RTL file, which represents circuitry via the utilization of interaction between registers. For some embodiments, the RTL file is received as part of the initial design input 112.

As shown, the design phase 110 may further include logic synthesis 113. During logic synthesis 113, an RTL file, which describes a plurality of Boolean logic equations, is translated into a representation of a set of logic gates. To improve area and power consumption for the design, a logic sharing transformation 114 is applied to the representation of the set of logic gates. The application of the logic sharing transformation includes adding an additional logic gate to the design, consolidating two or more common input signals of two or more logic gates as input signals to the additional logic gate, and providing an output of the additional logic gate to the two or more logic gates that share the two or more common input signals. A cube-literal matrix, which is a representation of the functional logic of the design, is used to identify and evaluate opportunities to apply the logic sharing transformation to the design. Contrary to conventional logic sharing techniques, the logic synthesis 113 of the IC design flow 100 utilizes a non-unique matrix representation of the functional logic in which NAND gates are not differentiated from AND gates, and NOR gates are not differentiated from OR gates. Further details regarding the process of using the non-unique cube literal matrix are discussed below.

A timing analysis and one or more optimization operations may be performed with respect to the design at optimization(s) 115. While the design process flow 100 shows the optimization(s) 115 occurring prior to generation of a layout instance 116, the timing analysis and the optimization operation(s) may be performed at any time (e.g., to verify or improve operation of a circuit design). For instance, in various embodiments, timing analysis in a circuit design may be performed prior to, during, or as part of RTL operations (e.g., performed as part of logic synthesis 113) or as part of a signoff 118, as described below.

After design inputs are used in the design input 112 operation to generate a circuit layout, and any of the logic synthesis 113 and the optimization(s) 115 are performed, a layout is generated (the layout instance 116). The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, further optimization(s) 115 may be performed.

Figure 2:
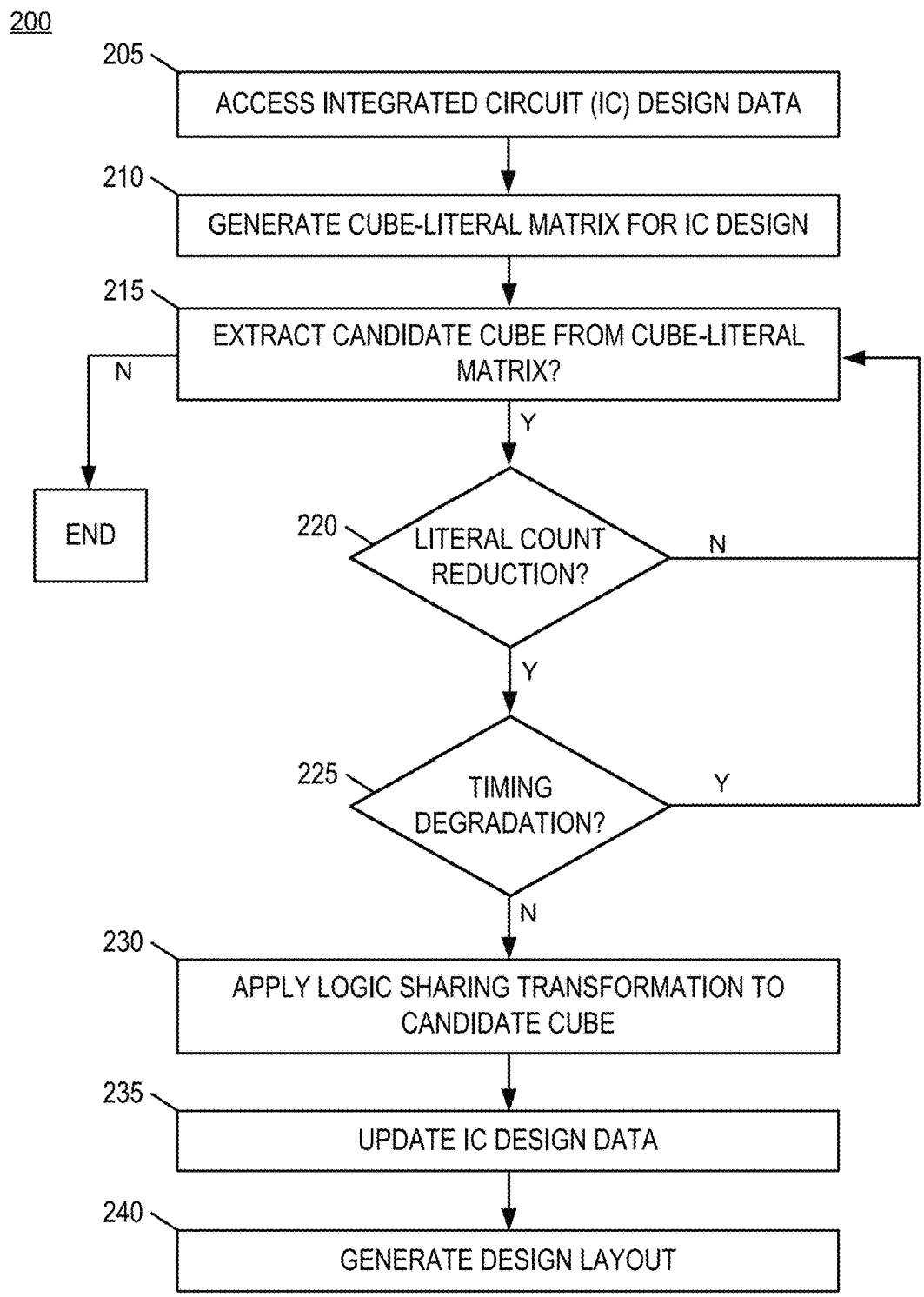
FIGS. 2 and 3 are flowcharts illustrating operations of a method for applying logic sharing transformation in an IC design process flow, according to some example embodiments.
Figure 3:
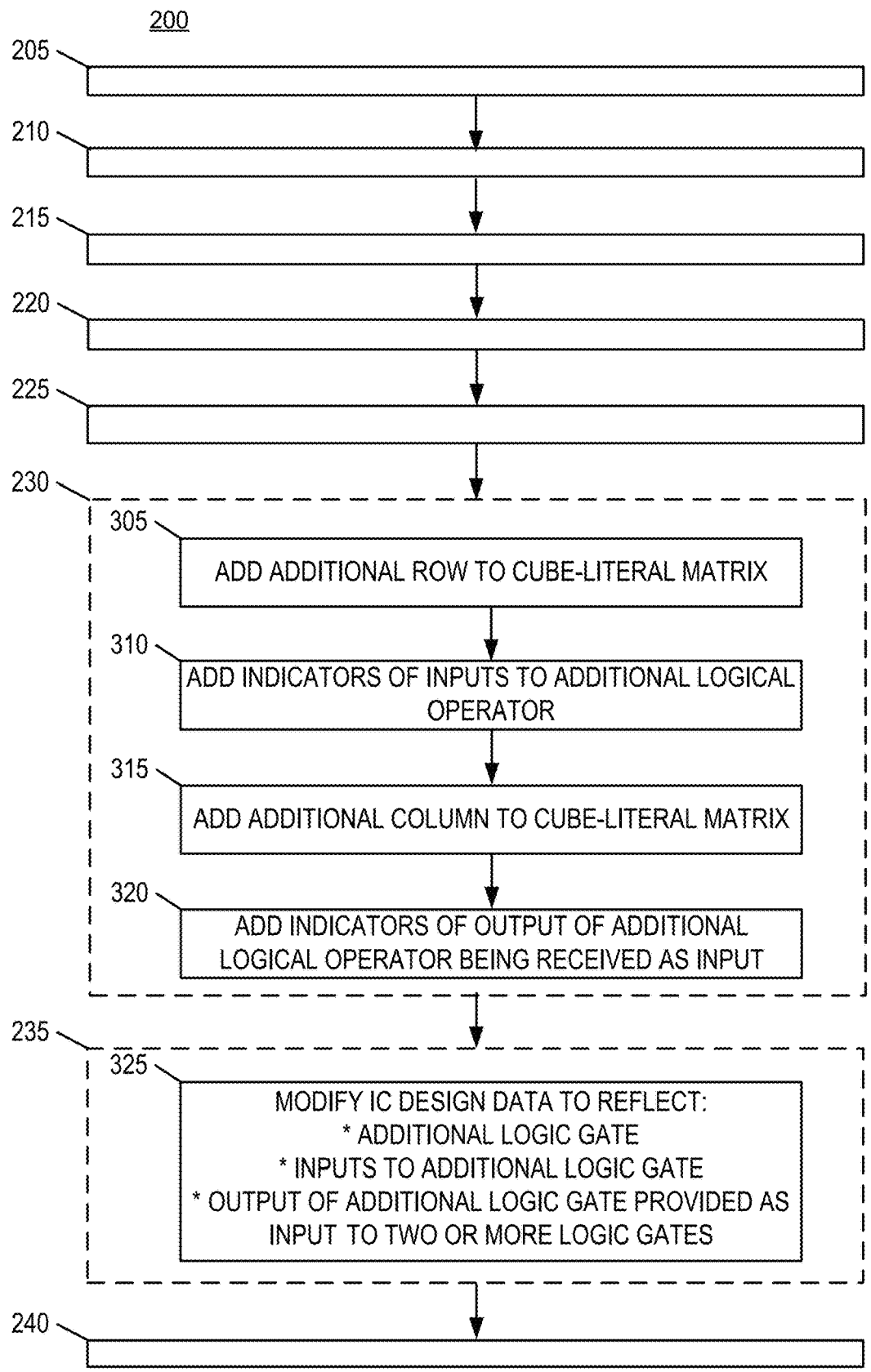

FIGS. 2 and 3 are flowcharts illustrating operations of a method for applying a logic sharing transformation in an IC design process flow, according to some example embodiments. For some embodiments, the method 200 is performed as part of a logic synthesis operation applied to a circuit design (e.g., by an EDA software system).

It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses data describing an IC design (also referred to herein as "IC design data") from memory. The IC design data can comprise or correspond to one or more IC design files stored in memory. The one or more IC design files may include an RTL file. The IC design specifies functional logic for implementation by a set of logic gates including any one or more of: an AND gate, a NAND gate, an OR gate, and a NOR gate.

At operation 210, the computing device generates a cube-literal matrix for the IC design. The cube-literal matrix comprises a non-unique matrix representation of the functional logic. Each row in the cube-literal matrix corresponds to a logical operator (e.g., implemented by a logic gate in the IC) and each column corresponds to an input signal provided to at least one logical operator. Each row of the cube-literal matrix includes an indication of which input signals are received by each logical operator. Within the context of the cube-literal matrix, the input signals of each column are referred to as "literals" and a set of literals is referred to as a "cube" (e.g., each row represents a cube).

In generating the cube-literal matrix for the IC design, the computing device converts functional logic of the IC design to a logical expression (a Boolean expression) and converts the logical expression to the cube-literal matrix without differentiating AND operators and NAND operators and without differentiating OR operators and NOR operators. That is, contrary to conventional techniques in which NAND operators are converted to OR operators and NOR operators are converted to AND operators prior to generating a cube-literal matrix, the cube-literal matrix is generated without treating AND and NAND operators differently and without treating OR and NOR operators differently. As a result, the cube-literal matrix generated for a first IC design can be the same as the cube-literal matrix generated for a second IC design where the first and second IC design include different functional logic.

More specifically, in generating the cube-literal matrix, the computing device creates a row for each logical operator in the functional logic represented by a corresponding logic gate in the circuit 400 without converting NAND logic to OR logic and without converting NOR logic to AND logic, in contrast to conventional techniques for generating cube-literal matrices. In addition, in generating the cube-literal matrix, the computing device generates a column for each literal. Also, the computing device populates cells of the cube-literal matrix to indicate literals received as input signal by each of the logical operators.

The computing device, at operation 215, extracts a candidate cube from the cube-literal matrix to evaluate for application of a logic sharing transformation. The candidate cube comprises a sub-matrix of the cube-literal matrix and corresponds to two or more common input signals of two or more logical operators.

The computing device evaluates whether to apply the logic sharing transformation to the candidate cube. In doing so, the computing device determines, at operation 220, whether application of logic sharing to the candidate cube results in an overall reduction to the literal count. The literal count comprises a count of input signals received by all logic gates in the IC design. The literal count of an IC design can be determined by summing the number of input signals received by each logic gate in the IC design. In an example, an IC comprises: a first AND gate that receives literals I1, I2, and I3 as inputs; and a second AND gate that receives I1, I3, I4, and I5. The IC in this example has a literal count of 7.

To determine whether application of the logic sharing transformation to the candidate cube results in a reduction to the literal count, the computing device computes a change to the overall literal count of the IC design. The computing device computes the change to overall literal count as follows:

$$\Delta = M(N-1)-1,$$

where M is the number of cubes (rows) in the candidate cube and N is the number of literals (columns) in the candidate cube. If $\Delta$ is a non-zero positive value, the application of the logic sharing transformation to the candidate cube results in an overall reduction to literal count for the design. Otherwise (e.g., if zero or negative), there is not an overall reduction to literal count associated with application of the logic sharing transformation.

If application of the logic sharing transformation to the candidate cube does not result in an overall reduction to literal count, the computing device maintains the cube-literal matrix in its current form without applying the logic sharing transformation to the candidate cube. For some embodiments, based on determining the candidate cube does not result in an overall reduction to literal count, the method 200 returns to operation 215, where the computing device attempts to extract another candidate cube. If another candidate cube cannot be extracted, the method 200 ends.

If application of the logic sharing transformation to the candidate cube does result in an overall reduction to the literal count, the method 200 moves to operation 225, where the computing device verifies whether application of the logic sharing transformation to the candidate cube results in a degradation to timing characteristics of the IC design. In doing so, the computing device may perform a timing analysis on the IC design with the logic sharing transformation applied to the candidate cube.

If application of the logic sharing transformation to the candidate cube does result in a timing degradation, the computing device maintains the cube-literal matrix in its current form without applying the logic sharing transformation to the candidate cube. For some embodiments, based on determining application of the logic sharing transformation to the candidate cube does result in timing degradation, the method 200 returns to operation 215, where the computing device attempts to extract another candidate cube. As noted above, if another candidate cube cannot be extracted, the method 200 ends.

If application of the logic sharing transformation to the candidate cube does not result in a timing degradation, the computing device, at operation 230, applies the logic sharing transformation to the candidate cube. As part of applying the logic sharing transformation to the candidate cube, the computing device updates the cube-literal matrix to reflect the transformation. The updating of the cube-literal matrix results in an updated cube-literal matrix.

At operation 235, the computing device updates the IC design data based on the updated cube-literal matrix. The computing device, at operation 240, generates a design layout instance for the IC device design based on the updated IC design data. The layout describes the physical layout dimensions of the IC device.

As shown in FIG. 3, the method 200 may, in some embodiments, further include operations 305, 310, 315, 320, and 325. For some embodiments, the operations 305, 310, 315, and 320 are performed as part of operation 230 where the computing device applies the logic sharing transformation to the candidate cube. At operation 305, the computing device adds an additional row to the cube-literal matrix corresponding to an additional logical operator. The computing device, at operation 310, adds indicators to the cube-literal matrix that the two or more common input signals are received by the additional logical operator rather than the two or more logical operators. The computing device further adds an additional column to the cube-literal matrix corresponding to an output of the additional logical operator, at operation 315. At operation 320, the computing device adds indicators to the cube-literal matrix that the output of the additional logical operator is provided as input signal to the two or more logical operators.

For these embodiments, the operation 325 can be performed as part of the operation 235 where the computing device updates the IC design data. At operation 325, the computing device modifies the IC design data to reflect: an additional logic gate corresponding to the additional row in the cube-literal matrix being added to the IC design; the two or more common input signals being provided as inputs to the additional logic gate; and an output of the additional logic gate being provided as input to two or more logic gates corresponding to the two or more logic gates corresponding to the candidate cube.

Figure 4:
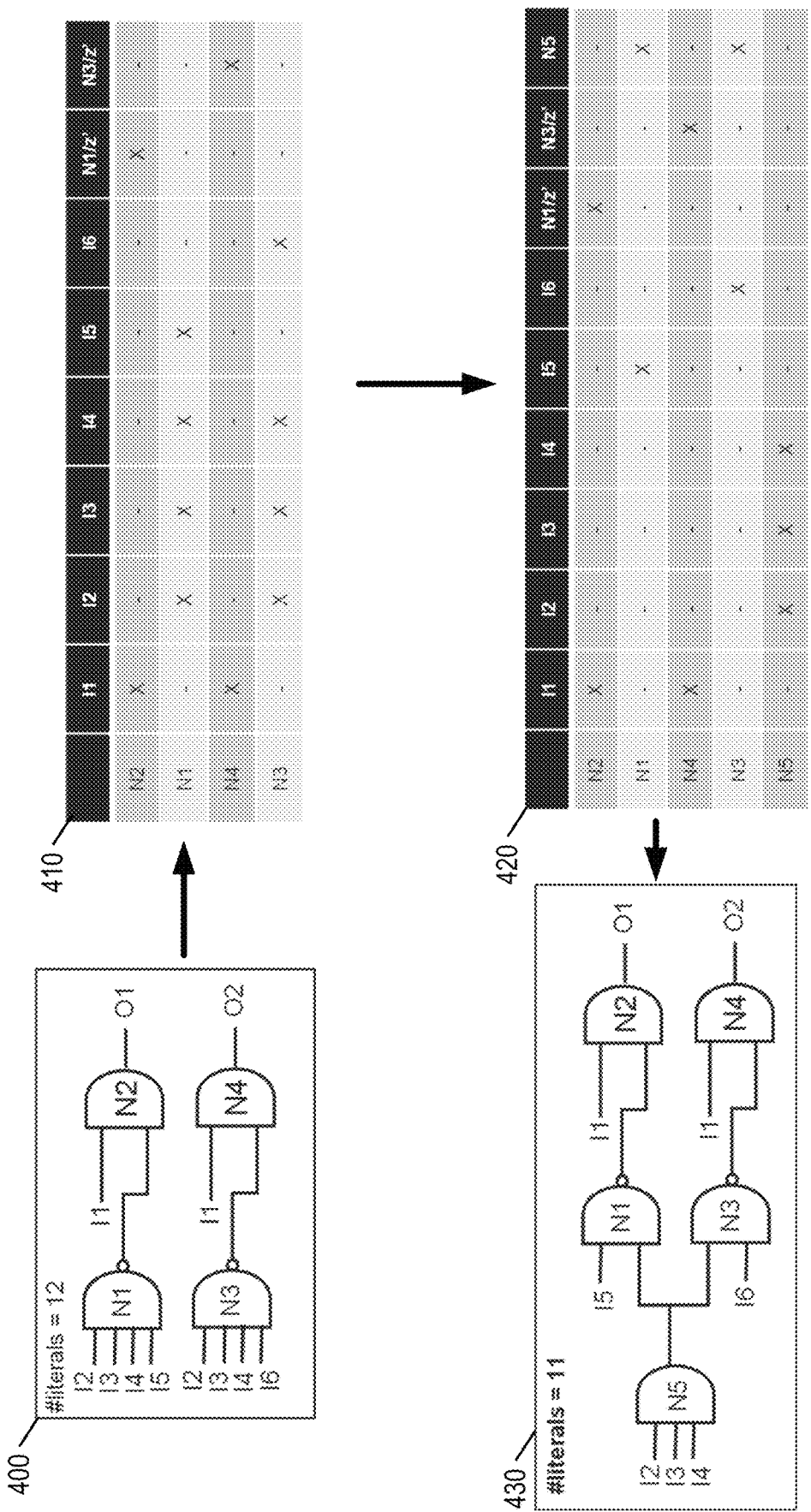
FIG. 4 is conceptual diagrams illustrating an example process for applying logic sharing transformations in an IC design process flow, according to some example embodiments.

An illustrative example of the method 200 is shown in FIG. 4. Accordingly, FIG. 4 is described below with reference to the computing device discussed in describing the method 200 (e.g., a computing device executing EDA software). With reference to FIG. 4, a circuit 400 is shown. The circuit 400 includes a set of logic gates (N1, N2, N3, and N4) corresponding to functional logic specified by data describing an IC design. In particular, the circuit 400 corresponds to the following functional logic:

O1=I1*(I2*I3*I4*I5)'

O2=I1*(I2*I3*I4*I6)'

In this example, I1, I2, I3, I4, I5, I6, N1/z' (the output of N1), and N3/z' (the output of N2) are considered the literals of the functional logic represented by circuit 400. Initially, the literal count in the circuit 400 is 12.

In performing logic synthesis on the IC design, the computing device generates a cube-literal matrix 410. In generating the cube-literal matrix 410, the computing device creates a row for each logical operator in the functional logic represented by a corresponding logic gate in the circuit 400 without distinguishing between NAND and AND gates. That is, contrary to conventional methods, the computing device generates a non-unique matrix representation of the circuit 400 without first converting the NAND logic to OR logic. Hence, as shown, the cube-literal matrix 410 includes a row corresponding to each of N1, N2, N3, and N4. I In addition, in generating the cube-literal matrix 410, the computing device generates a column for each literal. Hence, as shown, the cube-literal matrix 410, includes a column corresponding to each of I1, I2, I3, I4, I5, I6, N1/z', and N3/z'.

Also, the computing device populates cells of the cube-literal matrix 410 to indicate literals received as input by each of the logical operators. Hence, the cube-literal matrix 410 indicates: N2 receives I1 and N1/z'; N1 receives I2-I5; N4 receives I1 and N3/z'; and N3 receives I2-I4 and I6.

The computing device analyzes the cube-literal matrix 410 to identify opportunities for applying a logic sharing transformation to the IC design. In doing so, the computing device extracts candidate cube I2*I3*I4, which are common input signals to both N1 and N3. The computing device evaluates whether to apply the logic sharing transformation based on a change to the literal count. More specifically, the computing device applies the logic sharing transformation based on whether doing so results in a reduction to the literal count for the circuit 400. The computing device calculates the change to the literal count based on the number of rows and columns in the candidate cube in the manner described above, which results in a reduction to the literal count in the circuit 400 by 1 (i.e., 2*(3-1)-3=1), which brings the total literal count for the circuit 400 to 11.

Based on the application of the transformation providing a reduction to the total literal count of the circuit 400, the computing device applies the logic sharing transformation to the candidate cube. In doing so, the computing device generates an updated cube-literal matrix 420. As shown, the updated cube-literal matrix 420 includes an additional row corresponding to an additional logical operator (N5) and an additional column corresponding to an output of the additional logical operator (N5). The updated cube-literal matrix 420 further indicates that literals I2, I3, and I4 are received as input by N5 and that the output of N5 is provided as input to N1 and N3.

In addition, the computing device updates the data describing the IC design based on the updated cube-literal matrix 420, which is represented by updated circuit 430. As shown, based on the additional column (literal) and row, a logic gate N5 is included in the updated circuit 430. The logic gate N5 receives I2-I4 as input and the output of N5 is provided as input to N1 and N3.

Figure 5:
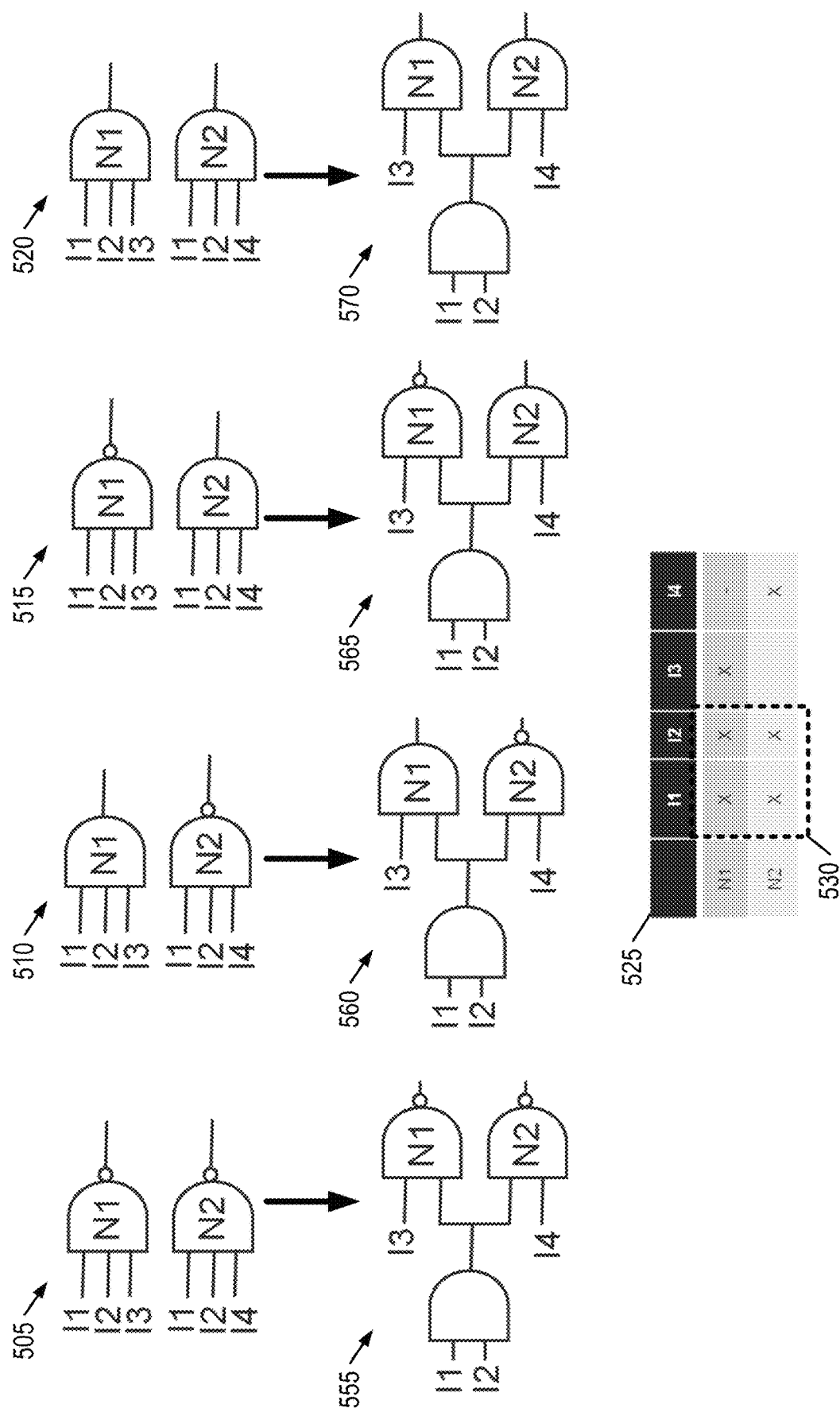
FIG. 5 is a conceptual diagram illustrating generation and use of a non-unique matrix representation of functional logic in performing logic sharing transformations to example IC designs, according to some example embodiments.

An illustrative example of the non-uniqueness of the cube-literal matrix generated in accordance with the method 200 is illustrated by FIG. 5. In particular, FIG. 5 shows a circuit 505 based on first functional logic, a circuit 510 based on second functional logic, a circuit 515 based on third functional logic, and a circuit 520 based on fourth functional logic. As shown, the functional logic represented by each of the circuits 505, 510, 515, and 520 is different. For example, in the circuit 505, both N1 and N2 are NAND gates; in the circuit 510, N1 is an AND gate and N2 is a NAND gate; in the circuit 515, N1 is a NAND gate and N2 is an AND gate; and in the circuit 520, both N1 and N2 are AND gates.

Despite the differences among the functional logic represented by circuit 505, 510, 515, and 520, generation of a cube-literal matrix, in accordance with embodiments described herein, results in the same cube-literal matrix, which is illustrated at 525 in FIG. 5. That is, given that the AND and NAND operators in the functional logic represented by each of the circuits 505, 510, 515, and 520 are treated the same with respect to generation of the cube-literal matrix, generation of the cube-literal matrix for each of the circuits 505, 510, 515, and 520 produces an identical result.

As shown in FIG. 5, the computing device can extract the candidate cube 530 from the cube-literal matrix to evaluate whether to apply the logic sharing transformation thereto. Based on determining that application of the logic sharing transformation to the candidate cube 530 results in a total reduction in literal count, the computing device updates the cube-literal matrix 525, in accordance with the logic sharing transformation, and converts the updated cube-literal matrix back to circuit form. A result of the foregoing is represented by: updated circuit 555 for the circuit 505; updated circuit 560 for the circuit 510; updated circuit 565 for the circuit 515; and updated circuit 570 for the circuit 520.

Figure 6:
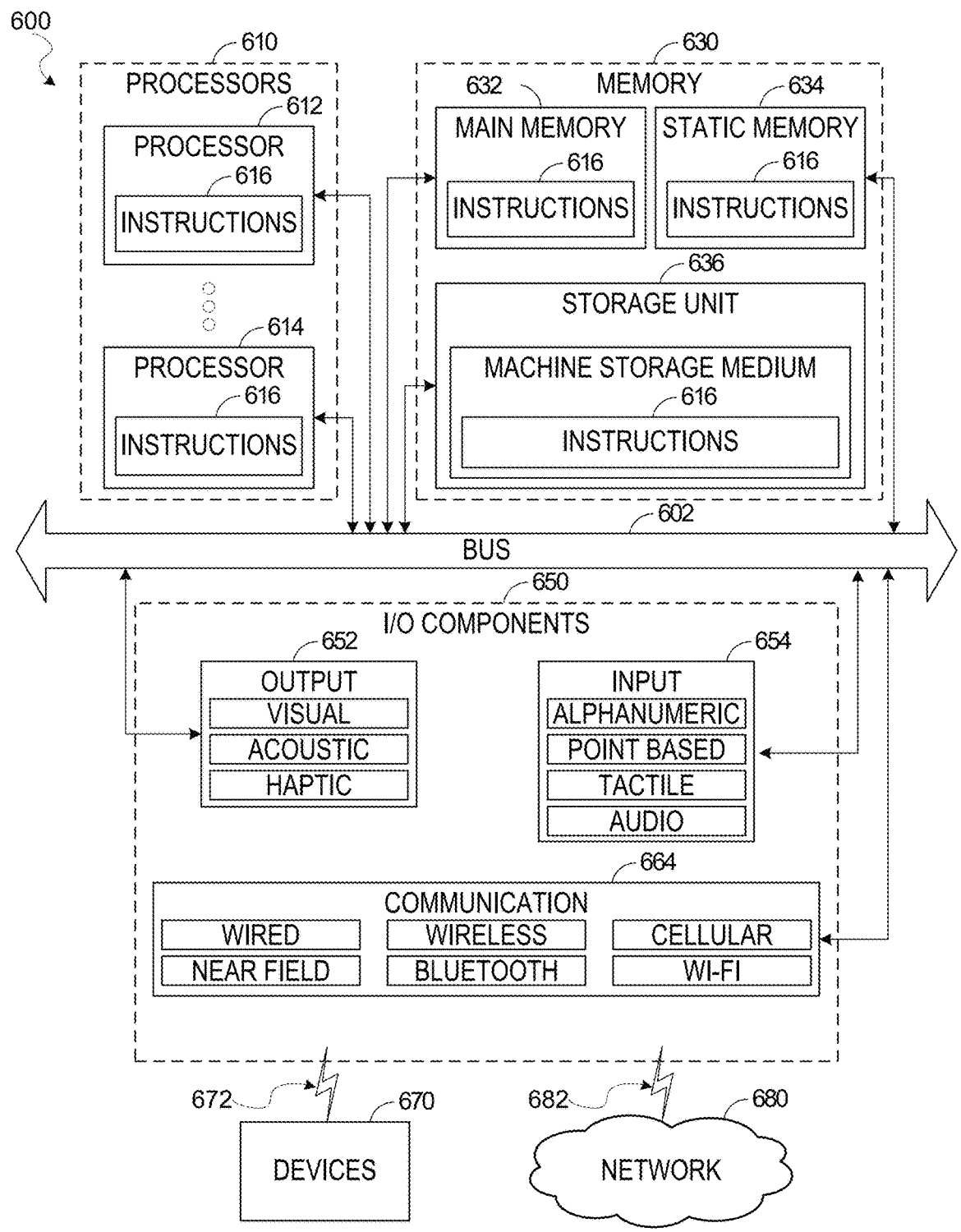
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute an EDA software system that executes the method 200. Additionally, or alternatively, the instructions 616 may implement the design process flow 100 of FIG. 1. The instructions 616 transform the general, non-programmed machine 600 into a particular machine 600 programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components (NFC, Bluetooth, and Wi-Fi) to provide communication via other modalities. The devices 670 may be another machine or any of a wide variety of peripheral devices (e.g., a peripheral device coupled via a universal serial bus (USB)).

Executable Instructions and Machine-Storage Medium

The various memories (e.g., 630, 632, 634, and/or memory of the processor(s) 610) and/or the storage unit 636 may store one or more sets of instructions and data structures (e.g., software) embodying or utilized by any one or more of the methodologies or functions described herein. These instructions, when executed by the processor(s) 610, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
generating a cube-literal matrix for an integrated circuit design, the cube-literal matrix comprising a non-unique matrix representation of functional logic in the integrated circuit design;
extracting, from the cube-literal matrix, a candidate cube comprising a sub-matrix of the cube-literal matrix corresponding to two or more common input signals of two or more logical operators corresponding to the functional logic;
determining whether application of a logic sharing transformation to the candidate cube results in a reduction to a literal count in the integrated circuit design;
updating the cube-literal matrix to reflect the application of the logic sharing transformation to the candidate cube based on determining the application of logic sharing transformation to the candidate cube results in the reduction to the literal count for the integrated circuit design, the updating of the cube-literal matrix resulting in an updated cube-literal matrix;
updating the integrated circuit design based on the updated cube-literal matrix.

2. The system of claim 1, wherein the generating of the cube-literal matrix comprises:
converting the functional logic to the cube-literal matrix without differentiating between AND operators and NAND operators and without differentiating between OR operators and NOR operators.

3. The system of claim 1, wherein:
the functional logic is first functional logic;
the operations further comprise generating a second cube-literal matrix comprising a representation of second functional logic that is different than the first functional logic; and
the second cube-literal matrix and the first cube-literal matrix are identical.

4. The system of claim 1, wherein:
the candidate cube is a first candidate cube;
the operations further comprise:
identifying, from the cube-literal matrix, a second candidate cube;
determining application of the logic sharing transformation to the second candidate cube results in a further reduction to the literal count in the integrated circuit design; and
updating the updated cube-literal matrix based on determining application of the logic sharing transformation to the second candidate cube results in the further reduction to the literal count in the integrated circuit design.

5. The system of claim 1, wherein:
the operations further comprise verifying that the application of logic sharing transformation to the candidate cube does not result in a timing degrading for the integrated circuit design, and
the updating of the cube-literal matrix is further based on verifying that the application of the logic sharing transformation to the candidate cube does not result in a timing degrading for the integrated circuit design.

6. The system of claim 1, wherein updating the of the cube-literal matrix comprises:
adding, to the cube-literal matrix, an additional row corresponding to an additional logical operator;
adding, to the cube-literal matrix, indicators that the two or more common input signals are received by the additional logical operator;
adding, to the cube-literal matrix, an additional column corresponding to an output of the additional logical operator; and
adding, to the cube-literal matrix, indicators that the output of the additional logical operator is provided as input to the two or more logical operators.

7. The system of claim 6, wherein the operations further comprise updating the integrated circuit design based on the updated cube-literal matrix, the updating of the integrated circuit design comprising modifying the integrated circuit design to reflect:
a logic gate corresponding to the additional logical operator being added to the integrated circuit design,
the two or more common input signals being provided as input to the logic gate, and
an output of the logic gate being provided as input to two or more other logic gates corresponding to the two or more logic operators corresponding to the candidate cube.

8. The system of claim 1, wherein determining whether application of logic sharing to the candidate cube results in the literal count reduction comprises:
computing a change in literal count in the integrated circuit design based on a number of rows and a number of columns in the candidate cube; and
determining the change is a non-zero positive value.

9. The system of claim 1, wherein the cube-literal matrix indicates one or more input signals for each logical operator in the functional logic.

10. The system of claim 1, wherein the operations further comprising accessing, from memory, data representing the integrated circuit design, wherein updating the integrated circuit design comprises updating the data representing the integrated circuit design based on the updated cube-literal matrix.

11. A method comprising:
accessing, from memory, data representing an integrated circuit design, the data representing the integrated circuit design including functional logic;
generating a cube-literal matrix for the integrated circuit design, the cube-literal matrix comprising a non-unique matrix representation of the functional logic;
extracting, from the cube-literal matrix, a candidate cube comprising a sub-matrix of the cube-literal matrix corresponding to two or more common input signals of two or more logical operators;

determining whether application of a logic sharing transformation to the candidate cube results in a reduction to a literal count in the integrated circuit design;

updating the cube-literal matrix to reflect the application of the logic sharing transformation to the candidate cube based on determining the application of logic sharing transformation to the candidate cube results in the reduction to the literal count for the integrated circuit design, the updating of the cube-literal matrix resulting in an updated cube-literal matrix; and updating the data representing the integrated circuit design based on the updated cube-literal matrix.

12. The method of claim 11, wherein the generating of the cube-literal matrix comprises:

converting the functional logic to the cube-literal matrix without differentiating between AND operators and NAND operators and without differentiating between OR operators and NOR operators.

13. The method of claim 11, wherein:

the functional logic is first functional logic;

the method further comprises generating a second cube-literal matrix comprising a representations of second functional logic that is different than the first functional logic;

and wherein the second cube-literal matrix and the first cube-literal matrix are identical.

14. The method of claim 11, wherein:

the candidate cube is a first candidate cube;

the method further comprises:

identifying, from the cube-literal matrix, a second candidate cube;

determining application of the logic sharing transformation to the second candidate cube results in a further reduction to the literal count in the integrated circuit design; and updating the updated cube-literal matrix based on determining application of the logic sharing transformation to the second candidate cube results in the further reduction to the literal count in the integrated circuit design.

15. The method of claim 11, further comprising verifying that the application of logic sharing transformation to the candidate cube does not result in a timing degrading for the integrated circuit design, wherein the updating of the cube-literal matrix is further based on verifying that the application of the logic sharing transformation to the candidate cube does not result in a timing degrading for the integrated circuit design.

16. The method of claim 11, wherein updating the of the cube-literal matrix comprises:

adding, to the cube-literal matrix, an additional row corresponding to an additional logical operator;

adding, to the cube-literal matrix, indicators that the two or more common input signals are received by the additional logical operator;

adding, to the cube-literal matrix, an additional column corresponding to an output of the additional logical operator; and adding, to the cube-literal matrix, indicators that the output of the additional logical operator is provided as input to the two or more logical operators.

17. The method of claim 16, wherein the updating of the data representing the integrated circuit comprises modifying the data to reflect:

a logic gate corresponding to the additional logical operator being added to the integrated circuit design, the two or more common input signals being provided as input to the logic gate, and an output of the logic gate being provided as input to two or more other logic gates corresponding to the two or more logic operators corresponding to the candidate cube.

18. The method of claim 11, wherein determining whether application of logic sharing to the candidate cube results in the literal count reduction comprises computing a change in literal count in the integrated circuit design based on a number of rows and a number of columns in the candidate cube; and determining the change is a non-zero positive value.

19. The method of claim 11, wherein the cube-literal matrix indicates one or more input signals for each logical operator in the functional logic.

20. A computer storage medium storing instructions, which when executed by a machine, cause the machine to perform operations comprising:

accessing, from memory, data representing an integrated circuit design, the data representing the integrated circuit design including functional logic;

generating a cube-literal matrix for the integrated circuit design, the cube-literal matrix comprising a non-unique matrix representation of the functional logic, a row in the cube-literal matrix corresponding to a logical operator corresponding to the functional logic, a column in the cube-literal matrix corresponding to an input signal to at least one of multiple logical operators corresponding to the functional logic;

extracting, from the cube-literal matrix, a candidate cube comprising a sub-matrix of the cube-literal matrix corresponding to two or more common input signals of two or more logical operators;

evaluating whether to apply a logic sharing transformation to the candidate cube based on a number of rows and a number of columns in the candidate cube;

updating the cube-literal matrix to reflect application of the logic sharing transformation to the candidate cube based on a result of the evaluating, the updating of the cube-literal matrix resulting in an updated cube-literal matrix; and updating the data representing the integrated circuit design based on the updated cube-literal matrix.

* * * * *